US006275569B1

(12) United States Patent
Cannon

(10) Patent No.: US 6,275,569 B1
(45) Date of Patent: Aug. 14, 2001

(54) CIRCULAR MEMORY ADDRESSING OPTION FOR AUDIO MESSAGES

(75) Inventor: Joseph M. Cannon, Montgomery County, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/942,789

(22) Filed: Oct. 2, 1997

(51) Int. Cl.[7] .................................................. H04M 1/64
(52) U.S. Cl. ........................ 379/88.01; 379/67.1; 379/83; 379/88.09; 379/88.28
(58) Field of Search ........................ 379/67.1, 83, 88.01, 379/88.04, 88.07, 88.1, 88.22, 88.23, 88.25, 88.27, 88.28, 68, 85

(56) References Cited

U.S. PATENT DOCUMENTS

| | | | |
|---|---|---|---|
| 4,221,933 | * | 9/1980 | Cornell et al. ..................... 379/88.28 |
| 4,769,642 | * | 9/1988 | Davis et al. ..................... 340/825.44 |
| 4,821,311 | * | 4/1989 | Hashimoto ......................... 379/88.28 |
| 4,829,514 | * | 5/1989 | Frimmel, Jr. et al. ............ 379/88.28 |
| 5,127,004 | * | 6/1992 | Lenihan et al. ..................... 379/67.1 |
| 5,153,579 | * | 10/1992 | Fisch et al. ..................... 340/825.22 |
| 5,644,627 | * | 7/1997 | Segal et al. ............................. 379/67 |
| 5,717,818 | * | 2/1998 | Nejime et al. ......................... 395/2.2 |

* cited by examiner

Primary Examiner—Binh K. Tieu
(74) Attorney, Agent, or Firm—William H. Bollman

(57) ABSTRACT

In a digital voice messaging system, a circular message storage selection is added to allow the digital voice messaging system to automatically overwrite previously-stored, e.g., the oldest messages in voice memory as necessary for storage of the newest voice message when the voice memory is filled. Another embodiment of the invention further provides the ability to prioritize certain previously stored voice messages over other stored voice messages to prevent overwriting of the prioritized voice messages when the circular message storage selection is enabled, but which allows overwriting of non-prioritized voice messages.

36 Claims, 4 Drawing Sheets

CIRCULAR MEMORY ADDRESSING OPTION FOR AUDIO MESSAGES

BACKGROUND OF THE INVENTION

1. Field of the Invention

This invention relates generally to the storage of digital voice message data in memory. More particularly, it relates to managed storage of new voice messages over previously stored older voice messages to provide a virtually endless ability to store new voice messages in a digital voice messaging system even after the voice message memory is filled.

2. Background of Related Art

Voice messaging has become an everyday requirement in today's society. Early voice messaging systems comprised magnetic cassette tapes which recorded a significant amount of voice messages, e.g., 60 minutes of voice messages. However, cassette tapes were disadvantageous because of the mechanics and time required to fast-forward and rewind the cassette tapes to the storage points of individual messages. Moreover, cassette tape voice message systems were not best suited in a business environment where multiple persons may utilize a common telephone switching system or voice messaging system.

More recently, particularly as the size of memory has increased in density while at the same time decreased in price, digital voice messaging systems have become commonplace. Voice compression techniques such as linear predictive coding (LPC) or code-excited linear predictive (CELP) coding utilized by some conventional digital voice messaging systems maximized the length of voice messages which could be stored in the finite amount of memory provided in such apparatus.

FIG. 7 shows a prior art digital voice messaging apparatus. A signal from a microphone 806 or other analog signal source is input to a codec 804 for conversion to $\mu$-law or A-law pulse code modulated (PCM) data. The $\mu$-law or A-law PCM data is output to an encoder/decoder functional block 803 including a voice compression encoder 803a and voice compression decoder 803b. The codec 804 also receives PCM data from the voice compression decoder 803b and converts that PCM data into an analog signal for output to and playback by a speaker 808.

The voice messaging system may be a multiple user system with partitions in voice message memory corresponding to the plurality of users. Moreover, the individual components of the digital voice messaging system may be multiple channel devices capable of handling individual user voice mailboxes.

A processor 802 controls the encoder 803a and decoder 803b. Processor 802 also controls storage of the compressed (encoded) speech data from the voice compression encoder 803a into memory 800, and controls the retrieval of compressed speech data from memory 800 and output of the same to the voice compression decoder 803b, based on user selections at the message controls 810. Conventional message controls include PLAY, RECORD, FAST FORWARD, and REWIND.

Old messages are deleted from voice mailboxes or personal voice message systems in any of a multitude of ways. For instance, in some systems rewinding to a chronological point before a particular stored voice message effectively deletes all subsequently stored voice messages. However, these deletions must be performed for each message or group of messages stored. The deletion of stored messages is not automatic in conventional systems.

FIG. 8 depicts the utilization of memory 800 after the storage of an example maximum number of voice messages 601–605 of given lengths. Initially, no voice messages are stored in memory 800. Thereafter, a first message 601 is received by the voice messaging system relating to a particular mailbox or phone number, and is stored in memory 800. The first message 601 uses a small percentage of the full capacity of the memory 800 as depicted with respect to the vertical axis of FIG. 8. At the time that the first message 601 is stored in memory 800, most of the memory 800 is available for storage of voice messages.

When a second message 602 is received by the voice messaging system, it is stored in memory 800 in addition to the first message 601 which was previously stored. The third message 603, the fourth message 604, and the fifth message 605 are subsequently and similarly stored in memory 800 when received. As depicted in FIG. 8, the memory usage is nearly at capacity (i.e., 100%) after storage of the fifth message 605.

Storage of a sixth message 600 is cut-off because it exceeds the available voice message memory. Thereafter, no new messages can be stored in memory 800 until at least one of the previously-stored older messages 601–605 is deleted, freeing up some memory. Even then, if a voice message is longer than the freed-up memory, its storage in memory will be cut-off without the entire voice message being stored.

The maximum number of voice messages which can be stored in memory 800 is a direct function of the efficiency of the encoding and decoding techniques utilized in the encoder/decoder functional block 803, and the size of the memory 800. Generally, the larger the memory 800, and the more efficient the encoding technique, the greater the number of messages that can be stored in the digital voice messaging system.

When the memory 800 becomes nearly filled with messages, no new messages are allowed to be stored until old messages are manually deleted. Conventional digital voice messaging systems will not answer an incoming call if there is no available memory for storing a new message. This 'lock-out' feature ensures that old messages will not be deleted without being heard by the user. However, many users of voice messaging machines listen to messages and then do not delete the messages afterwards. This eventually results in an incapacitated voice messaging system which will not store any new voice messages until some amount of memory 800 is freed-up. The conventional way to free-up memory is to delete previously stored, old voice messages.

There is a need for a voice messaging system which, without manually deleting old voice messages, gives the user a balance between the ability to retain older messages and accepting new messages after the memory of the voice messaging system is full.

SUMMARY OF THE INVENTION

A voice messaging system is provided which includes a codec, encoder and decoder function, voice message memory and a processor. The processor controls storage of voice messages into the voice message memory. Inventively, the present invention includes a circular message storage selection which, when activated, allows newly-stored voice messages to automatically overwrite previously stored voice messages.

The present invention also provides a method of managing voice messages in a voice mail system. A maximum number of voice messages allowed to be stored in voice message memory is limited for an individual user of the voice mail system. Enablement of a circular message storage allows, when the individual user reaches the maximum, a newly-stored voice message to automatically overwrite a previously-stored voice message in the voice message memory for the individual user of the voice mail system.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
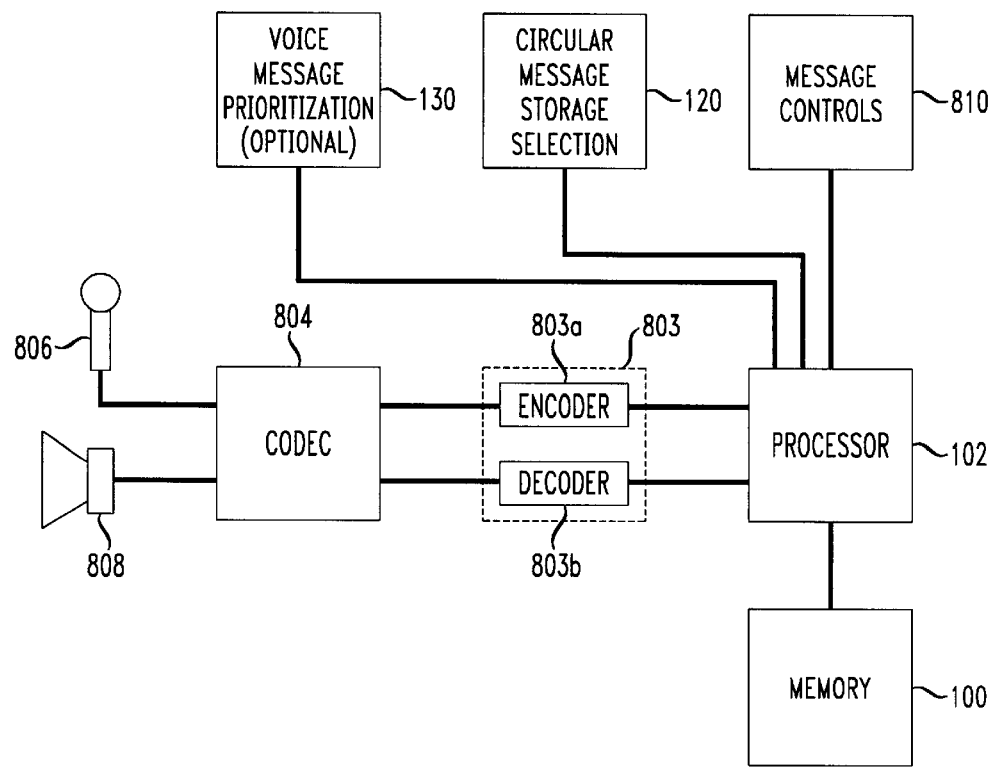
FIG. 1 shows a digital voice messaging system including a circular message storage selection, according to the present invention.

FIG. 1 shows a voice messaging system according to one embodiment of the present invention. The present invention relates to stand-alone voice messaging systems for individual or personal use, as well as to integrated voice mail systems popular in businesses for a plurality of users.

A signal from a microphone 806 or other analog signal source is input to a codec 804 for conversion into linear, μ-law or A-law PCM data. Codec 804 also correspondingly converts linear, μ-law or A-law PCM data into an analog signal for output to and playback on a speaker 808.

A voice compression encoder/decoder functional block 803 is formed by a voice compression encoder 803a and voice compression decoder 803b. The voice compression encoder/decoder functional block 803 may be implemented as a single component, e.g., in a digital signal processor (DSP), or as two separate devices: a voice compression encoder device and a voice compression decoder device. The particular voice compression utilized may be virtually any conventional compression technique, including but in no way limited to LPC, CELP, Adaptive Differential Pulse Code Modulation (ADPCM), bit robbing, and sample reduction.

Moreover, the voice compression encoder 803a and decoder 803b may or may not have a variable rate. Generally a single rate encoder/decoder is less expensive than a variable rate encoder/decoder.

FIG. 1 includes a circular message storage selection 120 input to the processor 102. The processor 102 may be a microprocessor, microcontroller, or digital signal processor (DSP). Moreover, the processor 102 may include other functions of the invention, e.g., the encoder/decoder functional block 803.

In one embodiment, the circular message storage selection 120 is a simple switch or software enablement via keyboard or touch-tone entry which, when activated, enables subsequent circular message storage. When the switch of this embodiment is deactivated, circular message storage is disabled for subsequently stored voice messages, and continues to be disabled until circular message storage is again enabled by activation of the circular message storage selection 120. Enablement of the circular message storage feature enables automatic overwriting of the oldest voice messages in memory 100, if memory 100 is otherwise full, in chronological order from oldest to newest voice messages, until enough voice messages are freed-up to store the newly received voice message.

FIGS. 2 through 6 show in more detail the overwriting of voice messages in memory 100 when the circular message storage selection 120 of the voice messaging system is enabled.

Figure 2:
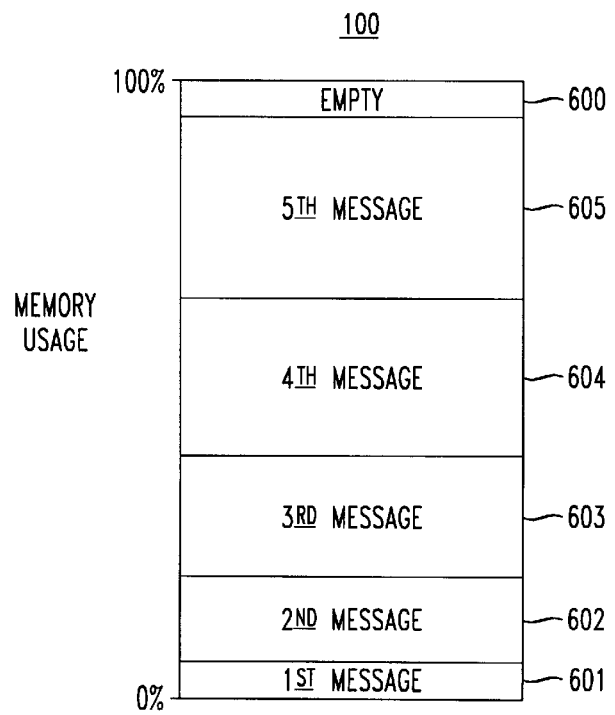
FIG. 2 depicts the voice storage memory of the voice messaging system with five sequentially-stored voice messages, according to the present invention.

FIG. 2 depicts the utilization of memory 100 with five voice messages 601–605 stored therein by the voice messaging system shown in FIG. 1. Memory 100 may be any suitable non-volatile or volatile memory such as RAM, FLASH or strataFLASH memory.

As a first voice message 601 is received by the voice messaging system, it is encoded by encoder 803a and stored in a first portion of memory 100. Although FIG. 2 may appear to depict the first voice message 601 as having been stored in the lowest addressable portion of memory, this is not necessarily the case. The memory usage depicted in the vertical axis of FIG. 2 (and FIGS. 3–5) merely refers to a percentage of total memory used to store voice messages, and not to specific addresses within the memory 100.

Storage of initial voice messages continues for the second through fifth messages 602–605, which nearly fill the voice message storage portion of memory 100, as shown in FIG. 2. Up until this point, no old or previously-stored voice messages are overwritten, whether or not the circular message storage selection 120 is selected, because the voice message capacity of memory 100 has not yet been fully utilized. However, after storage of the fifth voice message 605, utilization of the memory 100 approaches 100% as depicted in FIG. 2.

Figure 3:
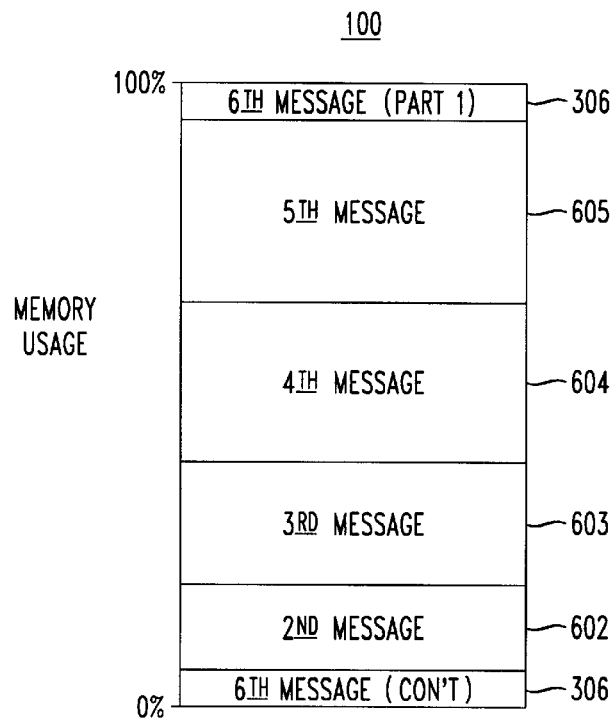
FIG. 3 depicts the voice storage memory of the digital voice messaging system with circular message storage wherein a sixth message automatically circularly overwrites the oldest non-prioritized voice message in memory, according to the present invention.

FIG. 3 shows how a subsequently-received voice message is stored in memory 100 once circular message storage selection 120 is enabled. The initial portion of the subsequently-received sixth message 306 is stored in the last remaining voice message portion of memory 100. Since the sixth voice message 306 is longer than the remaining amount of free voice message memory 100 and thus requires additional memory for storage, the oldest, first message 601 (FIG. 1) is overwritten with the remaining portion of the sixth message 306 as depicted at the bottom of FIG. 3.

In contrast, if the circular message storage selection 120 option is disabled or un-selected, the voice message system will act as a conventional system and not answer an incoming telephone call or store any more voice messages until some amount of memory 100 is freed-up by deleting previously-stored voice messages.

Figure 4:
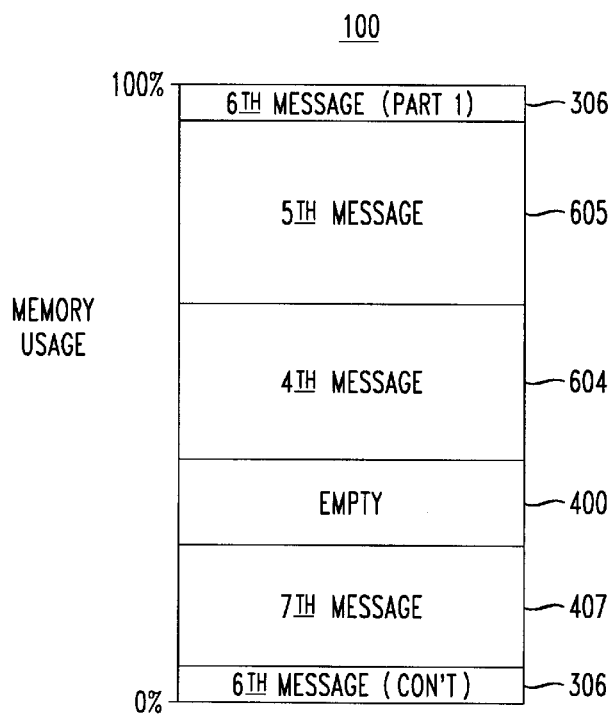
FIG. 4 depicts the overwriting of the second and third previously-stored older voice messages by a longer, newly stored seventh voice message, according to the present invention.

FIG. 4 depicts the storage of a seventh voice message 407 in memory 100 with the circular message storage selection 120 selected or enabled. The seventh voice message 407 initially overwrites the portion(s) of memory 100 where the second voice message 602 is stored. However, the seventh voice message 407 is a longer message than was the second voice message 602. Thus, after the memory freed-up by the overwriting of the second voice message 602 is filled with the initial portion of the seventh voice message 407, the seventh voice message 407 continues on and also overwrites the third voice message 603 with the remaining portion of the seventh voice message 407. Any remaining portion of memory of an overwritten voice message such as that remaining from the previous storage of the third voice message 603 is effectively empty or available memory 400.

Figure 5:
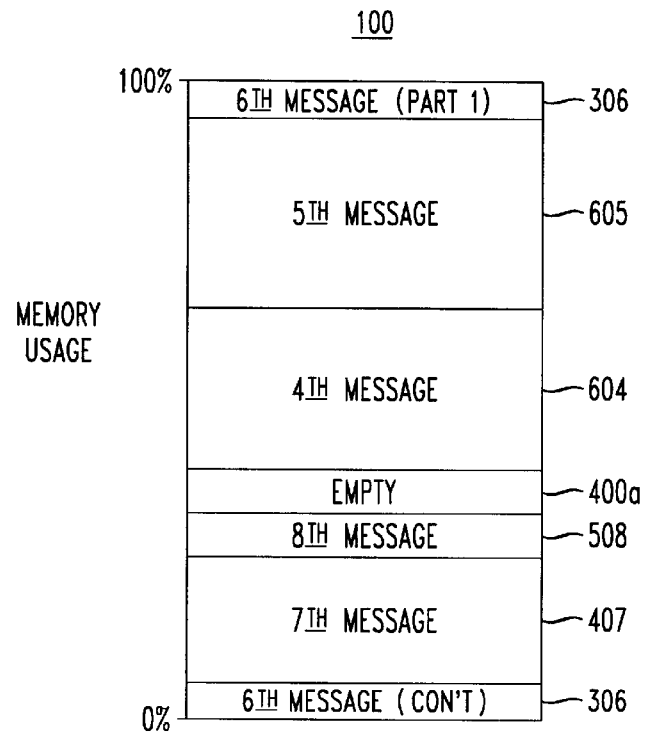
FIG. 5 depicts the storage of a newly received eighth voice message in the empty portion of the voice message memory created by the earlier circular overwriting of the third voice message by the seventh voice message, according to the present invention.

It is possible that a voice message need not necessarily be overwritten even when the circular message storage selection 120 is enabled. For instance, as shown in FIG. 5, a short eighth voice message 508 is simply stored in the empty portion 400 of memory 100 which was freed-up by the previous storage of the seventh voice message over the third voice message 603. Thus, the short eighth voice message 508 effectively continues to overwrite the third voice message 603 as did the seventh voice message 407.

In another embodiment of the present invention, certain stored voice messages may be "saved" or otherwise prioritized to avoid being overwritten by new voice messages. For instance, an optional voice message prioritization 130 (FIG. 1) may be selected by the user to indicate prioritization of any previously stored voice message.

Prioritization status can additionally or alternatively be extended to cover all unread or unlistened to messages. The header portion of stored voice messages can include a flag indicating whether or not the voice message has been listened to, and how many times the message has been listened to. Thus, prioritization of unread messages allows overwriting of only the previously-read voice messages.

The previously-read voice messages can be overwritten in order from oldest received to newest received. Alternatively, the previously-read voice messages can be overwritten in order from oldest listened to or read to newest oldest listened to or read. The previously-read voice messages can be overwritten based on the number of times the stored voice message has been listened to, 0 to n, the voice messages being listened to the most times being overwritten first.

Figure 6:
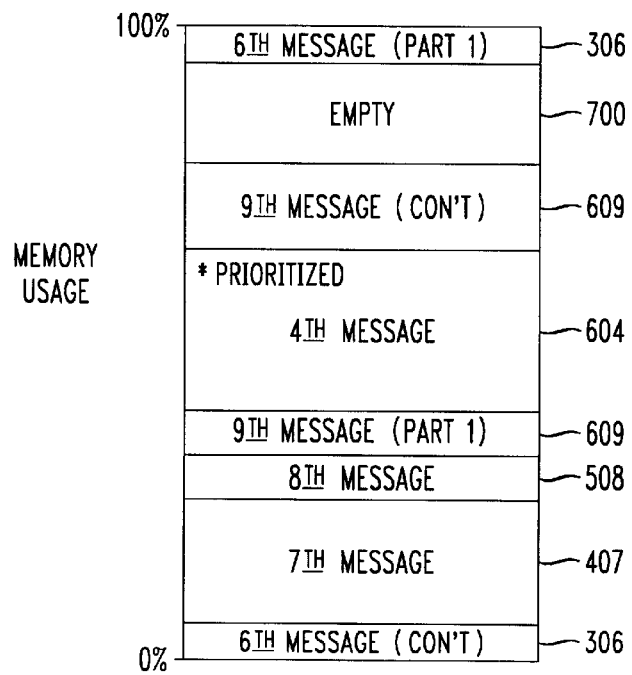
FIG. 6 depicts a prioritized fourth voice message, which was skipped over by the storage of a new ninth voice message, according to the present invention.
Figure 7:
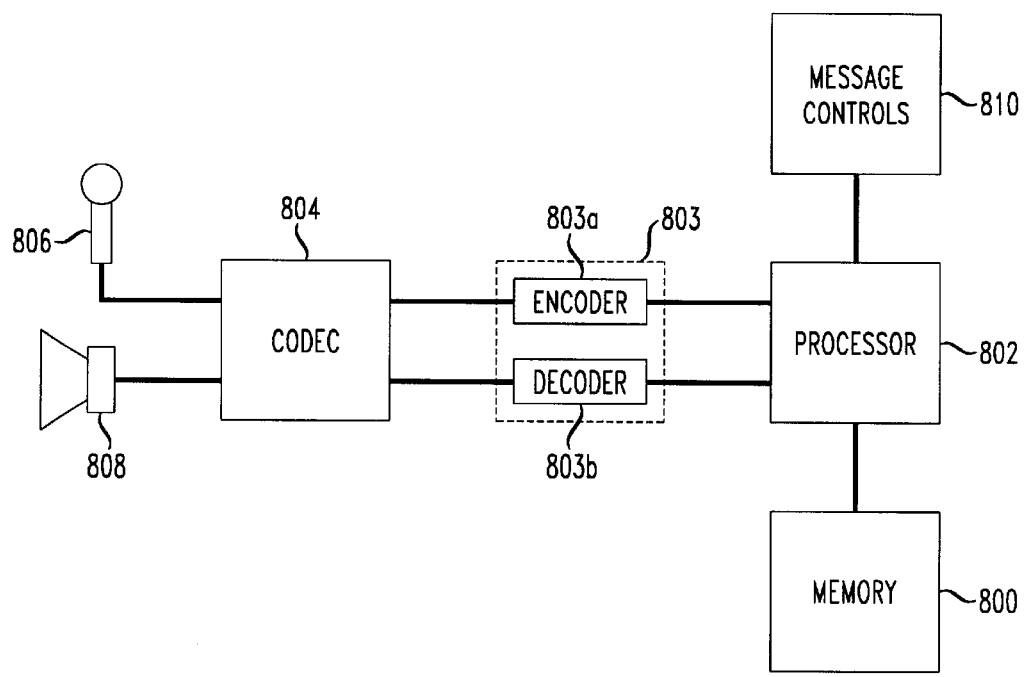
FIG. 7 depicts a conventional digital voice messaging system.
Figure 8:
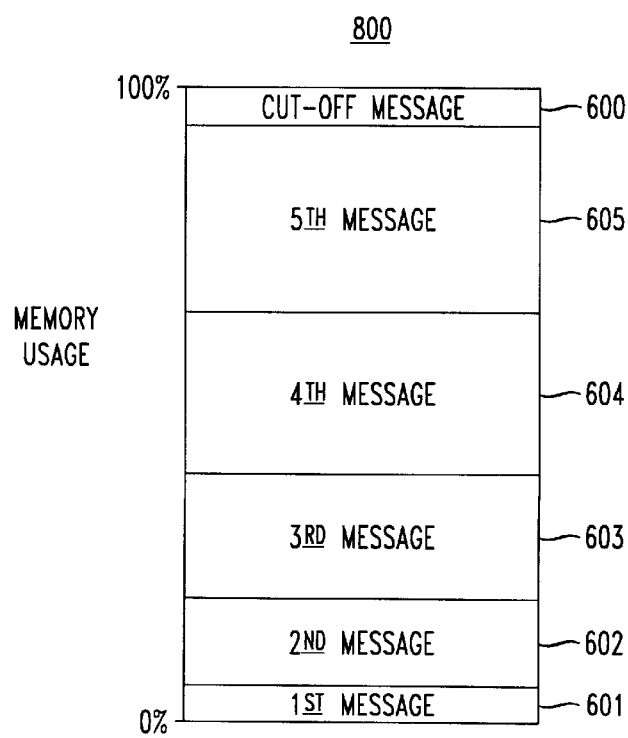
FIG. 8 depicts voice memory usage in a conventional digital voice messaging system.

FIG. 6 depicts the prioritization of the fourth voice message 604 indicating that the fourth voice message 604 is not to be overwritten by any subsequently stored voice message. After being saved or prioritized, the fourth voice message 604 can only be deleted and not overwritten.

The fourth voice message 604 may be prioritized in any of a number of ways. For instance, a momentary switch may be depressed by the user of the voice messaging system either during or immediately after playback of the fourth voice message 604 to indicate to the processor 102 (FIG. 1) that the fourth voice message 604 is to be prioritized. For security purposes, it is desirable to not allow de-prioritization of a voice message after it is prioritized except by deletion of the voice message. In another embodiment, voice messages are prioritized while reviewing a graphical list of messages, e.g., a list of callerID information associated with each of the stored voice messages. In this instance, a voice message prioritization 130 is selected for each listed voice message for which it is desired that it be saved or prioritized. In yet another embodiment, any voice messages stored while a two-position, voice message prioritization switch 130 is in a first, prioritize position will be prioritized. Once the voice message prioritization switch 130 is placed back in a second, non-prioritize position, the subsequently stored voice messages will not have automatic priority.

Some large, business-oriented voice mail systems have very large amounts of memory available for a plurality of users. Typically, the availability of voice message memory is managed by an administrator who limits the absolute number of voice messages which may be stored for any one user. The present invention relates equally to such voice mail systems.

For instance, when circular message storage is activated in a large voice mail system according to the present invention, storage of the voice message which exceeds the maximum number allowed for any particular user overwrites the oldest non-prioritized (or saved) message. Thus, if a user is allowed a maximum total of 20 voice messages, save or non-saved, then the $21^{st}$ voice message stored replaces the $1^{st}$ voice message, the $22^{nd}$ voice message stored replaces the $2^{nd}$, and so on until some voice messages are deleted by the user.

While the invention has been described with reference to the exemplary preferred embodiments thereof, those skilled in the art will be able to make various modifications to the described embodiments of the invention without departing from the true spirit and scope of the invention.

I claim:

1. A non-networked telephone answering device comprising:

a codec;

an encoder/decoder in communication with said codec;

a voice message memory; and a processor, including a circular message storage selection input, controlling storage of voice messages, received through said codec, in said voice message memory;

said circular message storage input is capable of storing a single voice message at non-contiguous memory addresses of said voice message memory.

2. The non-networked telephone answering device according to claim 1, wherein:

said circular message storage selection is activated by a user of said telephone answering device by depressing a switch.

3. The non-networked telephone answering device according to claim 1, wherein:

said circular message storage selection is activated by a user of said telephone answering device by touch tone input to said codec.

4. The non-networked telephone answering device according to claim 1, further comprising:

a prioritization selection to prioritize individual voice messages stored in said voice message memory.

5. A method of managing voice messages in a non-networked telephone answering device, comprising:

providing a maximum number of voice messages to be stored in voice message memory for a user of said telephone answering device; and allowing said user to activate a circular message storage feature of said voice message memory;

wherein said circular message storage feature is capable of storing a single voice message at non-contiguous memory addresses of said voice message memory.

6. The method of managing voice messages according to claim 5, wherein:

said previously-stored voice message is an oldest received voice message.

7. The method of managing voice messages according to claim 5, wherein:
said previously-stored voice message is an oldest previously-read voice message.

8. The method of managing voice messages according to claim 5, further comprising:
prioritizing voice messages in said voice message memory for said user.

9. The method of managing voice messages according to claim 6, further comprising:
preventing said prioritized individual voice messages from being overwritten when said circular message storage feature is enabled.

10. A voice message manager for a non-networked telephone answering device, comprising:
means to provide a maximum number of voice messages allowed to be stored in voice message memory for a user of said telephone answering device; and
means to allow said user to activate a circular message storage feature of said voice message memory;
wherein said circular message storage feature is capable of storing a single voice message at non-contiguous memory addresses of said voice message memory.

11. The voice message manager according to claim 10, wherein:
said previously-stored voice message is an oldest received voice message.

12. The voice message manager according to claim 10, wherein:
said previously-stored voice message is an oldest previously-read voice message.

13. The voice message manager according to claim 10, further comprising:
means for prioritizing individual voice messages in said voice message memory.

14. The voice message manager according to claim 13, further comprising:
means for preventing said prioritized individual voice messages from being overwritten when said means to allow said individual user to activate said circular message storage feature is activated.

15. A method of storing voice messages in a voice message memory of a non-networked telephone answering device, comprising:
storing in said telephone answering device a plurality of voice messages in said voice message memory; and
providing in said telephone answering device a user activated circular message storage feature in said voice messaging memory to allow overwriting, when a threshold in said voice message memory is exceeded, of voice messages previously stored in said voice message memory;
wherein said circular message storage feature is capable of storing a single voice message at non-contiguous memory addresses of said voice message memory.

16. The method of storing voice messages according to claim 15, wherein:
said allowed overwriting is continuous.

17. The method of storing voice messages according to claim 15, wherein:
said allowed overwriting of voice messages previously stored in said voice message memory are messages which were previously read.

18. The method of storing voice messages according to claim 15, further comprising:
prioritizing at least one of said plurality of voice messages in said voice message memory.

19. The method of storing voice messages according to claim 18, further comprising:
preventing overwriting of said at least one of said plurality of voice messages when said circular message storage feature is activated.

20. A voice message manager in a non-networked telephone answering device, comprising:
means in said telephone answering device for storing a plurality of voice messages in a voice message memory; and
means in said telephone answering device for providing a user activated circular message storage feature in said voice messaging memory to allow overwriting, when a threshold in said voice message memory is exceeded, of voice messages previously stored in said voice message memory;
wherein said circular message storage feature is capable of storing a single voice message at non-contiguous memory addresses of said voice message memory.

21. The method of storing voice messages according to claim 20, wherein:
said allowed overwriting is continuous.

22. The method of storing voice messages according to claim 20, wherein:
said allowed overwriting of voice messages previously stored in said voice message memory are messages which were previously read.

23. The voice message manager according to claim 20, further comprising:
means for prioritizing at least one said plurality of voice messages in said voice message memory.

24. The voice message manager according to claim 23, further comprising:
means for preventing overwriting of said at least one of said plurality of voice messages when said circular message storage feature is activated.

25. A non-networked telephone answering device comprising:
a codec;
an encoder/decoder in communication with said codec;
a voice message memory;
a processor controlling storage of voice messages, received through said codec, in said voice message memory; and
a circular message storage selection input to said processor to enable said voice message memory to operate as a circular message memory;
wherein said circular message memory is capable of storing a single voice message at non-contiguous memory addresses of said voice message memory.

26. A non-networked telephone answering device comprising:
a voice message memory;
a processor controlling storage of voice message; and
a circular message storage selection input to said processor to enable said voice message memory to operate as a circular message memory;
wherein said circular message storage input is capable of storing a single voice message at non-contiguous memory addresses of said voice message memory.

27. A non-networked telephone answering device according to claim 26, further comprising:

a codec in communication with said processor.

28. The non-networked telephone answering device according to claim 27, wherein:

said circular message storage selection input is activated by a user of said telephone answering device by touch input to said codec.

29. The non-networked telephone answering device according to claim 26, further comprising:

a prioritization selection to prioritize individual voice messages stored in said voice message memory.

30. A method of storing a voice message in a non-networked telephone answering device, comprising:

storing in said telephone answering device a plurality of voice messages in a voice message memory;

enabling a circular message storage feature to allow overwriting in said voice message memory by a circular message storage selection input;

selecting a location for storage of said voice message memory; and overwriting a previously-stored voice message in said location with another voice message in response to exceeding a capacity threshold in said voice message memory;

wherein said circular message storage feature is capable of storing a single voice message at non-contiguous memory addresses of said voice message memory.

31. The method of storing a voice message in a non-networked telephone answering device according to claim 30, further comprising:

said previously-stored message is an oldest stored voice message.

32. The method of storing a voice message in a non-networked telephone answering device according to claim 30, further comprising:

said previously-stored message is an oldest previously-read voice message.

33. The method of storing a voice message in a non-networked telephone answering device according to claim 30, further comprising:

prioritizing individual voice messages in said voice message memory.

34. The method of storing a voice message in a non-networked telephone answering device according to claim 33, further comprising:

preventing said prioritized voice individual voice messages from being overwritten in response to said selecting said location in said circular buffer.

35. A voice mailbox for a non-networked telephone answering device, comprising:

a voice message memory;

a circular message storage module to activate a circular message storage buffer in said voice message memory;

wherein said circular message storage buffer is capable of storing a single voice message at non-contiguous memory addresses of said voice message memory.

36. The voice mailbox for a non-networked telephone answering device according to claim 35, further comprising:

a prioritization module to prioritize individual voice messages stored in said voice message memory.

* * * * *